United States Patent [19]

Morishita et al.

[11] Patent Number: 4,724,916
[45] Date of Patent: Feb. 16, 1988

[54] MOTOR-DRIVEN POWER STEERING SYSTEM FOR A VEHICLE

[75] Inventors: Mitsuharu Morishita; Shinichi Kohge, both of Himeji; Koji Terauchi, Akashi, all of Japan

[73] Assignee: Mitsubishi Denki Kabushiki Kaisha, Japan

[21] Appl. No.: 26,466

[22] Filed: Mar. 16, 1987

[30] Foreign Application Priority Data

Mar. 19, 1986 [JP] Japan .............................. 61-63489
Mar. 19, 1986 [JP] Japan .............................. 61-63490

[51] Int. Cl.$^4$ ............................................. B62D 5/04
[52] U.S. Cl. ............................................. 180/79.1; 364/424
[58] Field of Search ...................... 180/79.1, 148, 142; 74/388 PS, 498; 364/424

[56] References Cited

U.S. PATENT DOCUMENTS

| | | | |
|---|---|---|---|
| 4,538,698 | 9/1985 | Hashimoto et al. | 180/79.1 |
| 4,577,715 | 9/1985 | Saito | 180/79.1 |
| 4,651,840 | 3/1987 | Shimizu | 180/79.1 |
| 4,660,669 | 4/1987 | Shimizu | 180/79.1 |

FOREIGN PATENT DOCUMENTS

| | | |
|---|---|---|
| 148664 | 7/1985 | European Pat. Off. . |
| 3542033 | 6/1986 | Fed. Rep. of Germany . |
| 57-99468 | 6/1982 | Japan .............................. 180/142 |

Primary Examiner—John A. Pekar
Attorney, Agent, or Firm—Leydig, Voit & Mayer

[57] ABSTRACT

A motor-driven power steering system for a vehicle wherein vehicle speed and operator-induced steering torque are detected for the control of power-assisting steering operation; a vehicle-speed sensor for detecting the vehicle speed to generate an output signal representative of the detected vehicle speed; a motor connected to be energized by a battery to transmit a force to the steerable road wheels for power assisting steering motion caused by the operator through the steering wheel; a first electromagnetic sliding clutch for controlling the power-assisting force transmitted from the motor to the steerable road wheels; a second electromagnetic switching clutch connected to be switched off for interrupting the transmission of the power-assisting force from the motor toward the steerable road wheels when the vehicle speed increases above a prescribed level, and switched on for transmission of the power-steering force therebetween when the vehicle speed decreases below the prescribed level; and a control unit connected to receive output signals from the torque sensor and the vehicle-speed sensor for controlling respective running and switching operations of the motor and the first sliding clutch in such a manner that the power-assisting force transmitted from the motor to the steerable road wheels through the first sliding clutch is gradually decreased before the second switching clutch is switched off, and gradually increased after the second switching clutch is switched on.

18 Claims, 9 Drawing Figures

MOTOR-DRIVEN POWER STEERING SYSTEM FOR A VEHICLE

BACKGROUND OF THE INVENTION

1. Field of the Invention

This invention relates to a motor-driven power steering system for a vehicle adapted to assist the operator-induced steering operation by means of the rotating force of a motor.

2. Description of the Prior Art

Figure 9:
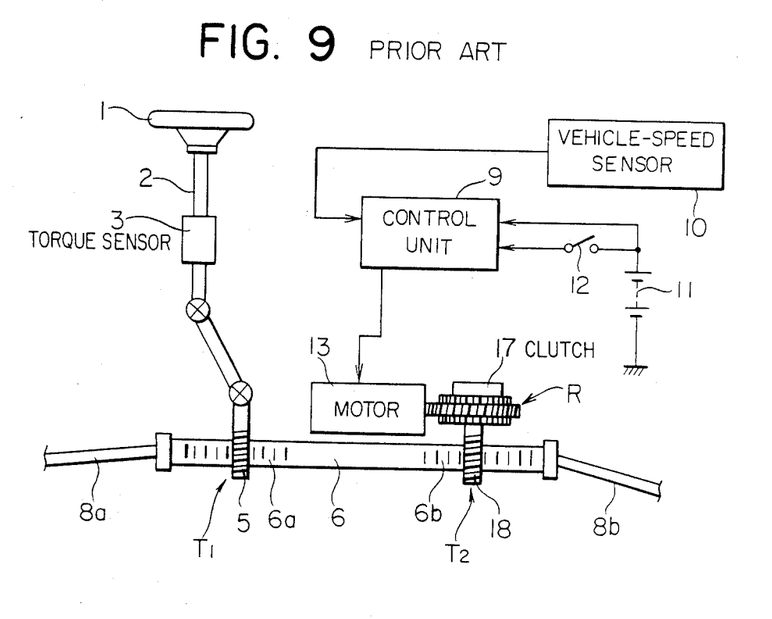
FIG. 9 is a schematic view illustrating a general arrangement of a conventional motor-driven power steering system for a vehicle.

In the past, a conventional power steering system of this type, as schematically illustrated in FIG. 9, has hitherto been known in which a steering wheel 1 is operatively connected through a steering shaft 2 and a first rack and pinion gear $T_1$ including a first pinion 5 and a first rack tooth portion 6a with a steering rack 6 which is connected at its opposite ends with a pair of steerable road wheels (not shown) through a pair of tie rods 8a and 8b so that when the steering wheel 1 is turned by an operator, the steerable road wheels (not shown) are appropriately steered in accordance with the steering motion of the steering wheel 1 exerted by the operator. On the other hand, the steering rack 6 is operatively connected with a motor 13 through a second rack and pinion gear including a second rack tooth portion 6b and a second pinion 18, a speed-reduction gear R, and a switching clutch 17 so that the driving force of the motor 13 is transmitted through the speed-reduction gear R, the switching clutch 17 and the second rack and pinion gear $T_2$ to the rack 6 so as to assist the steering operation of the steering wheel 1 exerted by the operator. The motor 13 is electrically connected with a battery 11 through a control unit 9 and a key or ignition switch 12 so that it is energized by the battery 11 under the control of the control unit 9. The control unit 9 is input with control signals from a steering-torque sensor 3 and a vehicle-speed sensor 10 so as to appropriately control the operation of the motor 13 and the switching clutch 17 on the basis of the steering torque and the vehicle speed measured.

The power steering system as constructed above has the following problems. Specifically, when the travelling speed of the vehicle increases above or decreases below a prescribed level, the control unit 9 operates to deenergize or energize the switching clutch 17 to interrupt and establish the transmission of the assisting force from the motor 13 to the rack 6, so as to switch the power steering system into a manual steering mode without any power assist or into a power steering mode with power assist. Accordingly, whenever the vehicle speed changes across a prescribed speed level, the operating mode of the steering system abruptly changes from power steering into manual steering or vice versa, thus causing the operator to feel a certain unsmoothness, unsureness, or instability in the steering.

SUMMARY OF THE INVENTION

In view of the above, the present invention has the objective of eliminating the above-described problem of the prior art, and has for its main object the provision of a novel and improved motor-driven power steering system for a vehicle which can be switched or transferred from power steering into manual steering or vice versa in an extremely smooth manner without causing any unsure feelings.

In order to achieve the above object, according to one aspect of the present invention, there is provided a motor-driven power steering system for a vehicle having a steering wheel operatively connected with steerable road wheels in response to a force exerted thereon by an operator, the motor-driven power steering system comprising:

a torque sensor connected to detect operator-induced steering torque resulting from steering force exerted on the steering wheel by the operator to generate an output signal representative thereof;

a vehicle-speed sensor for detecting vehicle speed to generate an output signal representative of the detected vehicle speed;

a motor operatively connected to the steerable road wheels and energized by a battery to transmit a force to the steerable road wheels for power assisting the steering motion caused by the operator through the steering wheel;

a first electromagnetic sliding clutch for controlling the power-assisting force transmitted from the motor to the steerable road wheels;

a second electromagnetic switching clutch connected to be switched off for interrupting the transmission of the power-assisting force from the motor toward the steerable road wheels when the vehicle speed increases above a prescribed level, and switched on for transmission of the power-steering force therebetween when the vehicle speed decreases below the prescribed level;

a control unit connected to receive output signals from the torque sensor and the vehicle-speed sensor for controlling respective running and switching operations of the motor and the first clutch in such a manner that the power-assisting force transmitted from the motor to the steerable road wheels through the first sliding clutch is gradually decreased before the second clutch is switched off, and gradually increased after the second clutch is switched on.

According to another aspect of the present invention, there is provided a motor-driven power steering system for a vehicle comprising:

a steering wheel;

a steering shaft fixedly connected with the steering wheel for integral rotation therewith;

a vehicle-speed sensor for detecting travelling speed of the vehicle to generate an output signal representative of the detected vehicle speed;

a torque sensor mounted on the steering shaft for detecting operator-induced steering torque resulting from steering force exerted on the steering wheel by an operator to generate an output signal representative of the detected steering torque;

a first pinion operatively connected with the steering shaft and connected to be driven by the steering wheel through the intermediary of the steering shaft;

a rack operatively connected through tie rods with a pair of steerable road wheels and having a first rack tooth portion and a second rack tooth portion formed thereon, the first rack tooth portion being in meshing engagement with the first pinion;

a second pinion being in meshing engagement with the second rack tooth portion on the rack;

a motor adapted to be energized by a battery and operatively connected through a speed-reduction gear with the second pinion for power assisting steering motion of the rack induced by the operator through the intermediary of the steering wheel, the steering shaft, the first pinion and the first rack tooth portion;

a first electromagnetic sliding clutch interposed between the motor and the second pinion for transmitting power therebetween substantially in proportion to the current supplied thereto;

a second electromagnetic switching clutch interposed between the motor and the second pinion for selectively disconnecting the operative connection between the motor and the second pinion when the vehicle speed increases above as prescribed level and establishing the operative connection therebetween when the vehicle speed decreases below the prescribed level; and a control unit connected to receive output signals from the torque sensor and the vehicle-speed sensor for controlling respective running and switching operations of the motor and the first clutch in such a manner that the power-assisting force transmitted from the motor toward the rack through the first clutch is gradually decreased before the second clutch is switched off, and gradually increased after the second clutch is switched on.

Preferably, the power-assisting torque transmitted from the motor toward the rack through the first clutch is gradually decreased or increased in inverse proportion to the measured vehicle speed. In this case, such a power-assisting torque may be gradually decreased or increased in a stepwise fashion.

In one embodiment, the control unit comprises:

a steering-torque measuring means connected to receive the output signal of the torque sensor for measuring the operator-induced steering torque;

a vehicle-speed measuring means connected to receive the output signal of the vehicle-speed sensor for measuring the vehicle speed;

a memory means for storing predetermined current values corresponding to varying vehicle speeds and steering torques;

a clutch-current determining means connected to read out from the memory means an appropriate current value corresponding to the measured steering torque and the measured vehicle speed for determining current to be supplied to the first clutch; and a clutch-current controlling means for controlling the switching operation of the first clutch in accordance with the current determined by the clutch-current determining means.

In this case, it is preferable that the memory means comprise:

a reduction-ratio storage means for storing second predetermined reduction ratios of the steering torque corresponding to varying vehicle speeds; and a control-torque calculating means connected to read out from the reduction-ratio storage means an appropriate reduction ratio corresponding to the measured vehicle speed and for calculating an appropriate control torque by multiplying the measured steering torque by the corresponding reduction ratio so as to determine the current to be supplied to the first sliding clutch on the basis of the calculated control torque.

In another embodiment, the control unit comprises:

a steering-torque measuring means connected to receive the output signal of the torque sensor for measuring the operator-induced steering torque;

a vehicle-speed measuring means connected to receive the output signal of the vehicle-speed sensor for measuring the vehicle speed;

a memory means for storing predetermined voltage values corresponding to varying vehicle speeds and steering torques;

a motor-voltage determining means connected to read out from the memory means an appropriate voltage value corresponding to the measured steering torque and the measured vehicle-speed for determining the voltage to be imposed on the motor; and a motor-voltage controlling means for controlling the running operation of the motor in accordance with the voltage determined by the motor-voltage determining means.

In this case, it is preferable that the memory means comprise;

a reduction-ratio storage means for storing predetermined reduction ratios of the steering torque corresponding to varying vehicle speeds; and a control-torque calculating means connected to read out from the reduction-ratio storage means an appropriate reduction ratio corresponding to the measured vehicle speed and for calculating an appropriate control torque by multiplying the measured steering torque by the corresponding reduction ratio so as to determine the voltage to be imposed on the motor on the basis of the calculated control torque.

In a further embodiment, the control unit comprises:

a steering-torque measuring means connected to receive the output signal of the torque sensor for measuring the operator-induced steering torque;

a vehicle-speed measuring means connected to receive the output signal of the vehicle-speed sensor for measuring the vehicle speed;

a first memory means for storing predetermined voltage values corresponding to varying vehicle speeds and steering torques;

a motor-voltage determining means connected to read out from the first memory means an appropriate voltage value corresponding to the measured steering torque and the measured vehicle-speed for determining the voltage to be imposed on the motor;

a motor-voltage controlling means for controlling the running operation of the motor in accordance with the voltage determined by the motor-voltage determining means;

a second memory means for storing predetermined current values corresponding to varying vehicle speeds and steering torques;

a clutch-current determining means connected to read out from the second memory means an appropriate current value corresponding to the measured steering torque and the measured vehicle-speed for determining the current to be supplied to the first clutch; and a clutch-current controlling means for controlling the switching operation of the first clutch in accordance with the current determined by the clutch-current determining means.

In this case, it is preferable that the first memory means comprises:

a first reduction-ratio storage means for storing first predetermined reduction ratios of the steering torque corresponding to varying vehicle speeds; and a first control-torque calculating means connected to read out from the first reduction ratio storage means a first appropriate reduction ratio corresponding to the measured vehicle speed and for calculating a first appropriate control torque by multiplying the measured steering torque by the corresponding first reduction ratio so as to determine the voltage to be imposed on the motor on the basis of the first calculated control torque; and that the second memory means comprises:

a second reduction-ratio storage means for storing second predetermined reduction ratios of the steering torque corresponding to varying vehicle speeds; and a second control-torque calculating means connected to read out from the second reduction ratio storage means a second appropriate reduction ratio corresponding to the measured vehicle speed and for calculating a second appropriate control torque by multiplying the measured steering torque by the corresponding second reduction ratio current to be supplied to the first sliding clutch on the basis of the second calculated control torque.

The above and other objects, features and advantages of the present invention will become apparent from the following detailed description of several presently preferred embodiments of the invention when taken in conjunction with the accompanying drawings.

BRIEF DESCRIPTION OF THE DRAWINGS

FIGS. 1 through 8 relate to a motor-driven power steering system in accordance with one embodiment of the present invention, in which

DESCRIPTION OF THE PREFERRED EMBODIMENTS

The present invention will now be described in detail with reference to a presently preferred embodiment thereof as illustrated in the accompanying drawings. In the following, the same parts or elements of the embodiments will be identified by the same reference numerals and characters as employed in FIG. 9.

Figure 1:
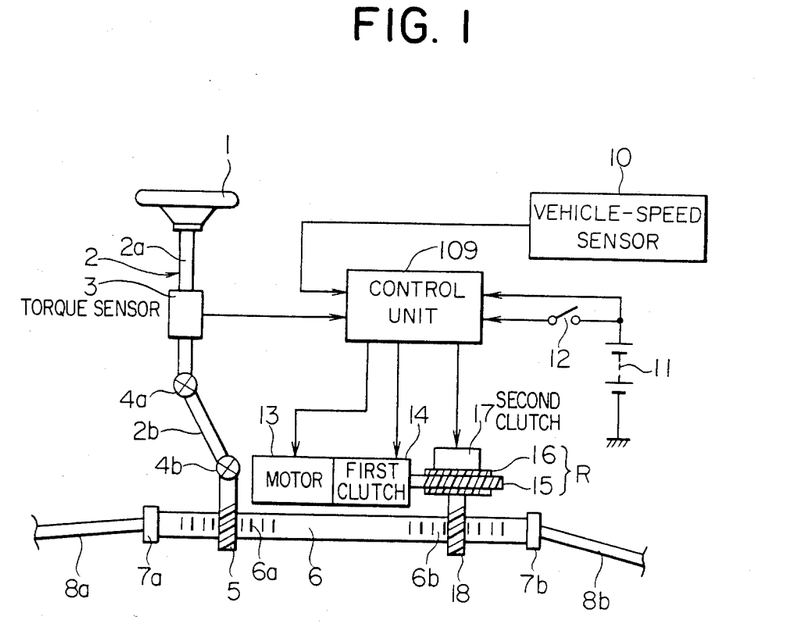
FIG. 1 is a schematic view illustrating a general arrangement of the same.

Referring to the drawings and first to FIG. 1, there is shown a general arrangement of a motor-driven power steering system for a vehicle constructed in accordance with the present invention. The motor-driven power steering system illustrated includes a steering wheel 1; a steering shaft 2 fixedly connected at its upper end with the steering wheel for integral rotation therewith and including an upper section 2a and a lower section 2b joined with each other through a first universal joint 4a; a torque sensor 3 mounted on the steering shaft 2 for detecting operator-induced steering torque resulting from steering force exerted on the steering wheel 1 by an operator and generating an electrical signal representative of the detected steering torque; a first pinion 5 operatively connected at its upper end with the the lower end of the steering shaft 2 through a second universal joint 4b; a rack 6 operatively connected at its opposite ends through ball joints 7a, 7b with tie rods 8a, 8b which are in turn connected with a pair of steerable road wheels (not shown), the rack 6 having a first tooth portion 6a in mesh with the first pinion 5 and a second tooth portion 6b axially spaced from or otherwise continuous with the first tooth portion 6a; a vehicle-speed sensor 10 for detecting the travelling speed of the vehicle and generating an output signal representative of the detected vehicle speed; a battery 11 adapted to be mounted on the vehicle; a key or ignition switch 12; a second pinion 18 in meshing engagement with the second rack tooth portion 6b on the rack 6; a motor 13 operatively connected through a speed-reduction gear R with the second pinion 18 for power assisting the steering motion of the rack 6 induced by the operator, the motor being preferably in the form of a direct current motor having a shunt winding field or a magnetic field and adapted to be driven to rotate by the battery 11; a first clutch 14 interposed between the motor 13 and the second pinion 18 for transmitting power therebetween substantially in proportion to the current supplied thereto, the first clutch 14 being preferably in the form of an electromagnetic sliding clutch such as, for example, a powder clutch, a hysteresis clutch or the like and directly coupled, in the illustrated embodiment, with an output shaft of the motor 13; a second clutch 17 in the form of an electromagnetic switching clutch interposed between the motor 13 and the second pinion 18 for selectively establishing and disconnecting an operative connection therebetween; and a control unit 109 connected to receive output signals from the torque sensor 3 and the vehicle-speed sensor 10 for controlling respective running and switching operations of the motor 13 and the first and second clutches 14, 17 in such a manner that the power-assisting force transmitted from the motor 13 toward the steerable road wheels is gradually decreased before the second switching clutch 17 is switched off, and gradually increased after the second switching clutch 17 is switched on. In the illustrated embodiment, the speed-reduction gear R comprises a worm 15 operatively connected with an output shaft of the first sliding clutch 14, and a worm wheel 16 in mesh with the worm 15. The second electromagnetic switching clutch 17 serves to mechanically couple or disconnect the worm wheel 16 with the second pinion 18.

Figure 2:
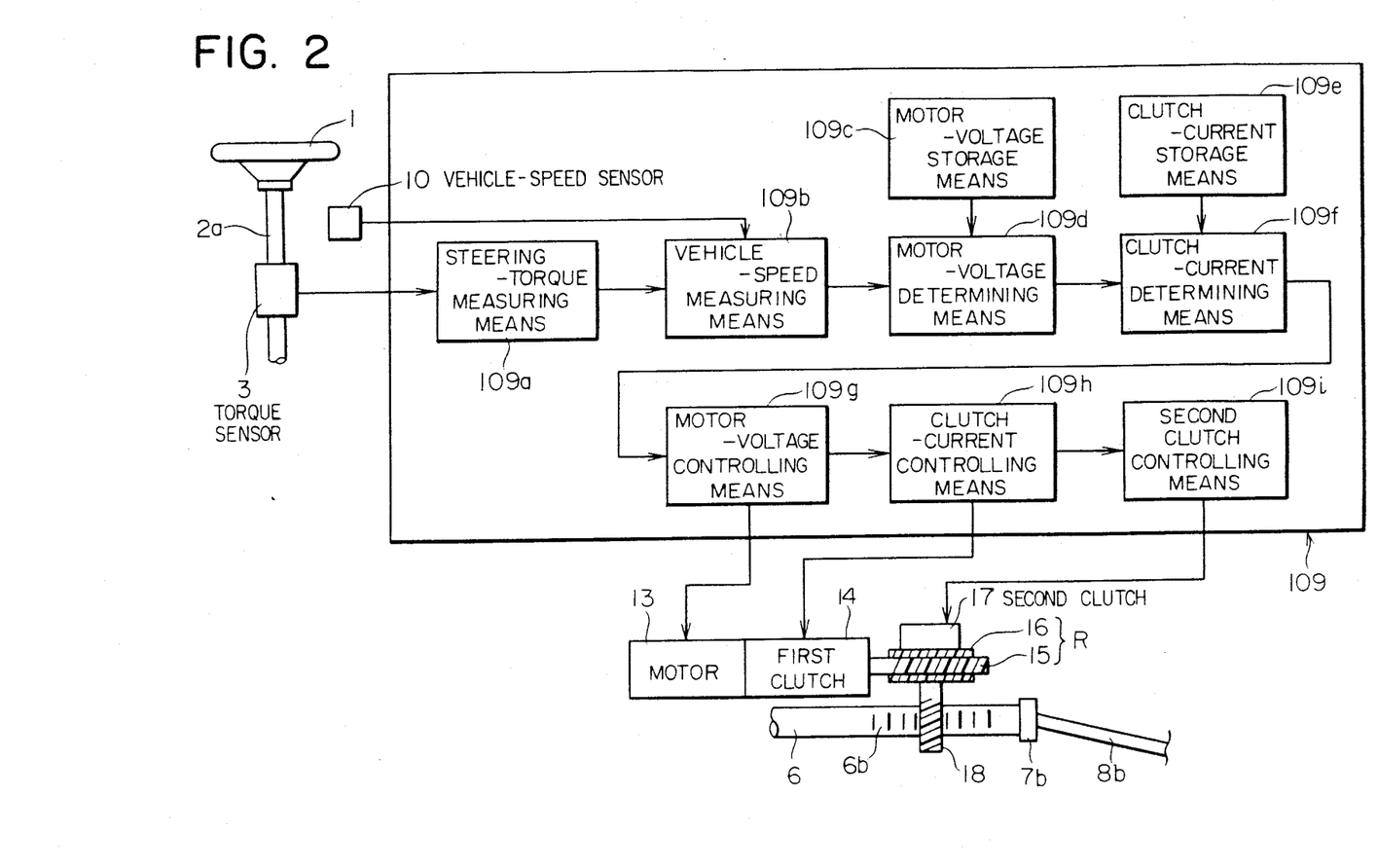
FIG. 2 is a block diagram showing a control unit and its related parts.

As diagrammatically illustrated in FIG. 2, the control unit 109 comprises: a steering-torque measuring means 109a connected to receive the output signal of the torque sensor 3 for measuring the operator-induced steering torque; a vehicle-speed measuring means 109b connected to receive the output signal of the the vehicle-speed sensor 10 for measuring the vehicle speed; a first memory means 109c for storing predetermined voltage values corresponding to varying vehicle speeds and steering torques; a motor-voltage determining means 109d connected to read out from the first memory means 109c an appropriate voltage value corresponding to the measured steering torque and the measured vehicle-speed for determining the voltage to be imposed on the motor 13; a second memory means 109e for storing predetermined current values corresponding to varying vehicle speeds and steering torques; a clutch-current determining means 109f connected to read out from the second memory means 109e an appropriate current value corresponding to the measured steering torque and the measured vehicle-speed for determining the current to be supplied to the first electromagnetic sliding clutch 14; a motor-voltage controlling means 109g for controlling the running operation of the motor 13 in accordance with the voltage determined by the motor-voltage determining means 109d; a clutch-current controlling means 109h for controlling the switching operation of the first electromagnetic sliding clutch 14 in accordance with the current determined by the clutch-current determining means 109f; and a clutch controlling means 109i for controlling the second electromagnetic switching clutch 17 in such a manner that the second clutch 17 is switched off when the vehicle speed increases above a prescribed level, and switched on when the vehicle speed decreases below the prescribed level.

Figure 3:
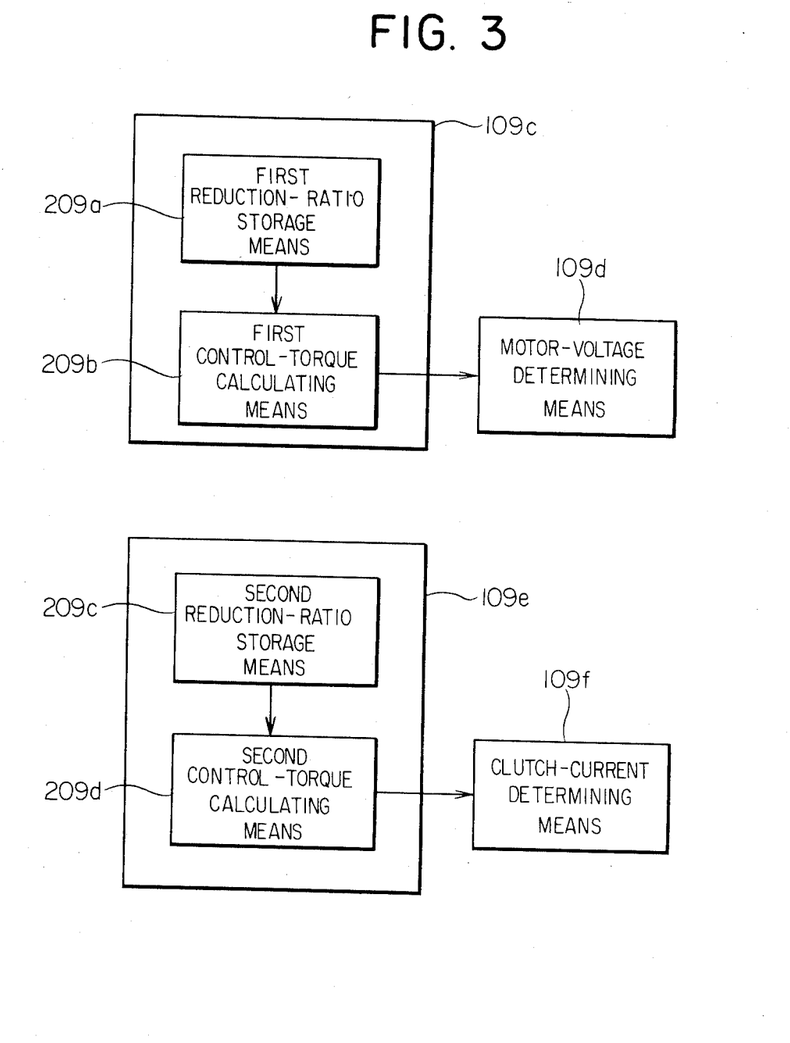
FIG. 3 is a block diagram showing a motor-voltage storage means and a clutch-current storage means of the control unit.

As illustrated in FIG. 3, the first memory means 109c comprises: a first reduction-ratio storage means 209a for storing first predetermined reduction ratios of the steering torque corresponding to varying vehicle speeds; and a first control-torque calculating means 209b connected to read out from the reduction-ratio storage means an appropriate reduction ratio corresponding to the measured vehicle speed and for calculating a first appropriate control torque by multiplying the measured steering torque by the corresponding first reduction ratio so as to determine voltage to be imposed on the motor on the basis of the first calculated control torque. Also, the second memory means 109e comprises: a second reduction-ratio storage means 209c for storing second predetermined reduction ratios of the steering torque corresponding to varying vehicle speeds; and a second control-torque calculating means 209d connected to read out from the second reduction ratio storage means a second appropriate reduction ratio corresponding to the measured vehicle speed and for calculating a second appropriate control torque by multiplying the measured steering torque by the corresponding second reduction ratio so as to determine the current to be supplied to the second switching clutch on the basis of the second calculated control torque.

Now, the operation of the power steering system of this embodiment will be described with reference to FIGS. 1 through 8. First, the case in which a vehicle is stationary or standing still will be considered. In this case, when the key switch 12 is first turned on to start the engine, the electromagnetic clutch 17 is automatically actuated to place the second pinion 18 into mechanical coupling with the worm wheel 16. In this state, when the steering wheel 1 is turned by an operator, the control unit 109 acts to control the operations of the motor 13 and the sliding clutch 14 in the manner as illustrated in FIG. 5 which shows a relationship between steering torque, motor voltage and clutch current. More specifically, when steering torque increases in the righthand direction to point a in FIG. 5, the motor 13 is turned on and then imposed with 100% voltage at point b. As the steering torque further increases, current begins to flow through the electromagnetic clutch 14 at point c and the intensity of the current increases logarithmically with respect to an increase in the steering torque, and reaches 100% current at point d. On the other hand, as the steering torque decreases, current flowing through the electromagnetic sliding clutch 14 begins to decrease at point d and reaches 0% current at point c. In accordance with a further decrease in the steering torque, the motor 13 is turned off at point e so that the voltage imposed on the motor 13 becomes 0% at point f. Similar to this, the motor 13 and the first electromagnetic sliding clutch 14 are controlled in the same manner when the steering torque increases or decreases in the lefthand direction.

Figure 4:
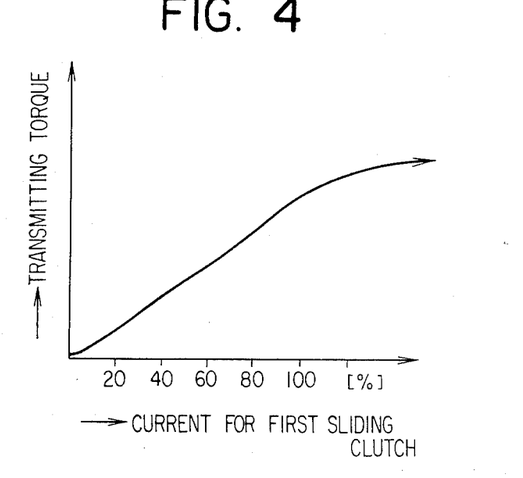
FIG. 4 is a graphic representation showing current-/torque characteristics of a first electromagnetic clutch.
Figure 5:
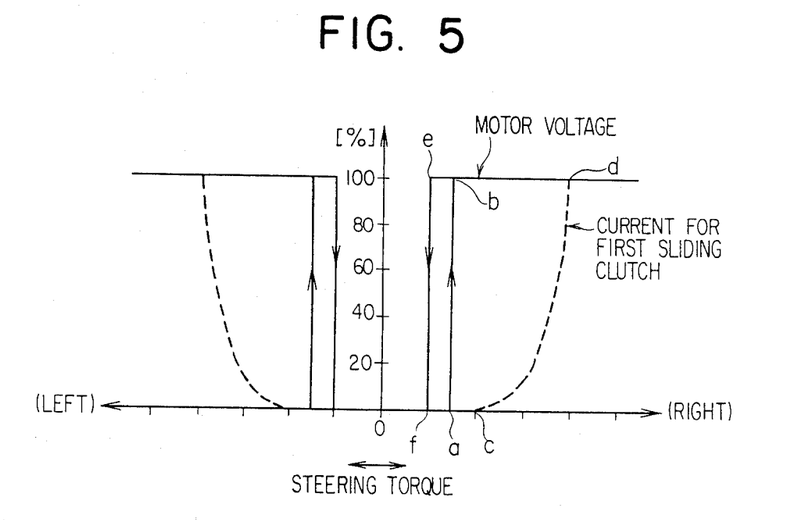
FIG. 5 is a characteristic view showing a steering-torque/motor-voltage relationship and a steering-torque/first-clutch-current relationship when the vehicle is standing still.

As shown in FIG. 4, the characteristic of the sliding clutch 14 is used in a range in which transmitting torque or sliding torque increases substantially in direct proportion to clutch current. Accordingly, as is clear from FIG. 5, the motor 13 is imposed with 100% voltage and energized to start rotating when steering torque increases to point a. As the steering torque further increases, current flowing through the sliding clutch 14 begins to gradually increase at point c so that the output torque transmitted from the sliding clutch 14 to the worm 15 increases gradually. As a result, auxiliary torque having an intensity corresponding to the turning force exerted on the steering wheel by an operator is transmitted from the motor 13 to the second tooth portion 6b on the rack 6 via the sliding clutch 14, the worm wheel 16, the electromagnetic clutch 17 and the second pinion 18, thereby lightening the steering operation for the operator.

Figure 6:
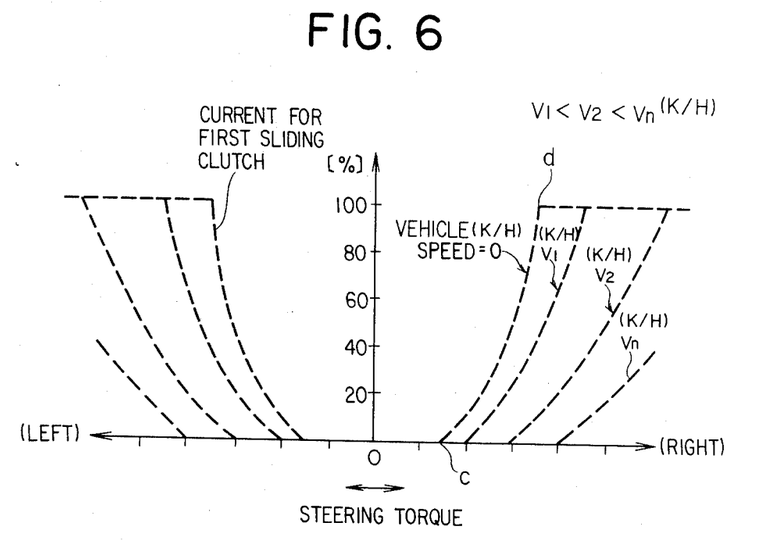
FIG. 6 is a characteristic view showing a steering torque/first-clutch-current relationship when the vehicle speed changes.
Figure 7:
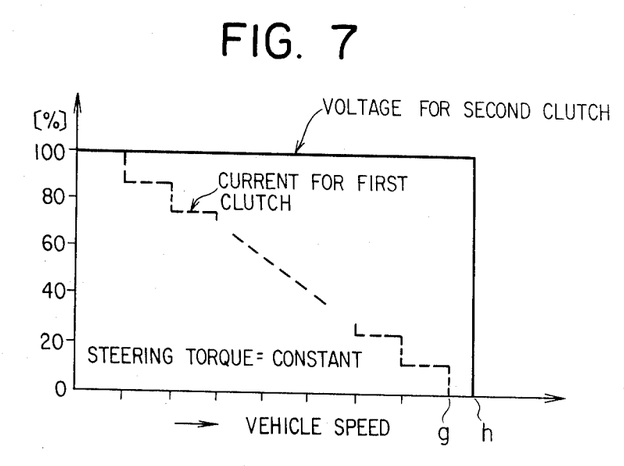
FIG. 7 is a characteristic view showing a vehicle speed/first-clutch current relationship and a vehicle speed/second-clutch current relationship when the steering torque is constant.
Figure 8:
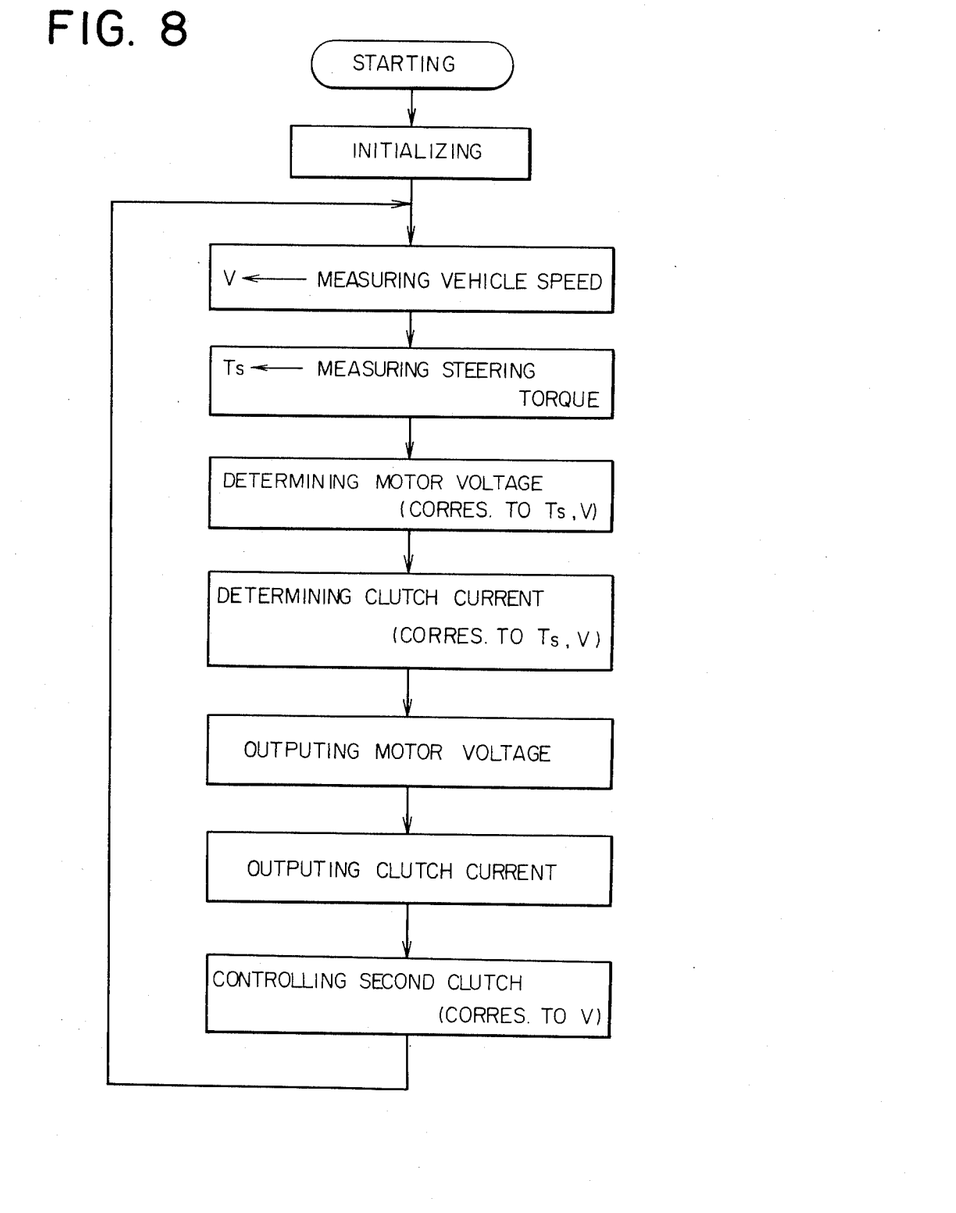
FIG. 8 is a flow chart showing the control processes of the power steering system of FIG. 1 as controlled by the control unit illustrated in FIG. 2.

Now, the case in which the vehicle is travelling will be considered. In this case, as seen from FIG. 6, current flowing through the first sliding clutch 14 is controlled by the control unit 109 on the basis of the current value which is previously stored in the clutch-current storage means 109e and which is determined by the steering torque and the vehicle speed in an appropriate manner. Specifically, as shown in FIG. 6, the clutch current is determined such that it begins to rise or increase at point c and reaches 100% or full static current at point d, the rising curve becoming more gradual in accordance with an increase in the vehicle speed. Also, the starting point of the rising curve displaces from a smaller steering torque side toward a larger steering torque side in accordance with an increase in the vehicle speed. More particularly, in cases where the steering torque is assumed to be constant, the clutch current supplied to the first sliding clutch 14 is controlled to decrease in a stepwise fashion in inverse proportion to an increase in the vehicle speed. For example, the clutch current is controlled by the control torque determined by the product of the steering torque and a reduction ratio which corresponds to the vehicle speed so that it gradually decreases in a stepwise manner as illustrated in FIG. 7. Thus, the clutch current is made zero at point f even when steering torque is exerted on the steering wheel 1. When the vehicle speed further increases to point h in FIG. 7, the second electromagnetic switching clutch 17 is switched off or deenergized to release the engagement or mechanical coupling between the worm wheel 16 and the second pinion 18, thereby switching the steering system into a manual steering mode without any power assist. In this manner, the torque transmitted from the motor 13 to the rack 6 is gradually decreased in accordance with an increase in the vehicle speed under the action of the first sliding clutch 14 so that it is made zero before switching off or deenergization of the second switching clutch 17. On the other hand, as the vehicle speed decreases, the transmission torque or sliding torque of the first sliding clutch 14 begins to increase after the second switching clutch 17 is energized to mechanically couple the worm wheel 16 with the second pinion 18. As a result, the steering system can change over from the power steering mode into the manual steering mode or vice versa in an extremely smooth manner without giving rise to any feelings of unsureness or instability which would otherwise be caused by abrupt connection or disconnection of the second switching clutch 17.

Also, the voltage imposed on the motor 13 is likewise controlled in the same manner as the current supplied to the first sliding clutch 14. Though not illustrated, it is possible to control either the motor voltage or the clutch current supplied to the first sliding clutch 14 alone.

The above control of the power steering system can be installed simply by replacing the conventional control program of a control unit with that of the present invention without changing the general arrangement of a conventional power steering system. Accordingly, it is possible to manufacture the motor-driven power steering system of the present invention at low cost.

What is claimed is:

1. A motor-driven power steering system for a vehicle having a steering wheel operatively connected to steer steerable road wheels in response to force exerted thereon by an operator, said motor-driven power steering system comprising:
a torque sensor connected to detect operator-induced steering torque resulting from steering force exerted on said steering wheel by the operator to generate an output signal representative thereof;
a vehicle-speed sensor for detecting vehicle speed to generate an output signal representative thereof;
a motor operatively connected with said steerable road wheels and energized by a battery to transmit a force to said steerable road wheels for power assisting steering motion caused by the operator through said steering wheel;
a first electromagnetic switching clutch for controlling the power-assisting force transmitted from said motor to said steerable road wheels;
a second electromagnetic sliding clutch connected to be switched off for interrupting the transmission of the power-assisting force from said motor toward said steerable road wheels when the vehicle speed increases above a prescribed level and switched on for establishing the transmission of the power-steering force therebetween when the vehicle speed decreases below the prescribed level;
a control unit connected to receive output signals from said torque sensor and said vehicle-speed sensor for controlling respective running and switching operations of said motor and said first sliding clutch in such a manner that the power-assisting force transmitted from said motor to said steerable road wheels through said first sliding clutch is gradually decreased before said second switching clutch is switched off and gradually increased after said second switching clutch is switched on.

2. A motor-driven power steering system for a vehicle according to claim 1 wherein the power-assisting force transmitted from said motor to said steerable road wheels through said first sliding cluch is gradually decreased or increased in inverse porportion to the vehicle speed detected by said vehicle-speed sensor.

3. A motor-driven power steering system for a vehicle according to claim 1 wherein the power-assisting force transmitted from said motor to said steerable road wheels through said first sliding cluch is gradually decreased or increased in a stepwise fashion.

4. A motor-driven power steering system for a vehicle according to claim 1, wherein said control unit comprises:
a steering-torque measuring means connected to receive the output signal of said torque sensor for measuring the operator-induced steering torque;
a vehicle-speed measuring means connected to receive the output signal of said vehicle-speed sensor for measuring the vehicle speed;
a memory means for storing predetermined current values corresponding to varying vehicle speeds and steering torques;
a clutch-current determining means connected to read out from said memory means an appropriate current value corresponding to the measured steering torque and the measured vehicle speed for determining current to be supplied to said first sliding clutch; and
a clutch-current controlling means for controlling switching operation of said first sliding clutch in accordance with the current determined by said clutch-current determining means.

5. A motor-driven power steering system for a vehicle according to claim 4 wherein said memory means comprises:
a reduction-ratio storage means for storing predetermined reduction ratios of the steering torque corresponding to varying vehicle speeds; and
a control-torque calculating means connected to read out from said reduction-ratio storage means an appropriate reduction ratio corresponding to the measured vehicle speed and for calculating an appropriate control torque by multiplying the measured steering torque by the corresponding reduction ratio so as to determine the current to be supplied to said first sliding clutch on the basis of the calculated control torque.

6. A motor-driven power steering system for a vehicle according to claim 1 wherein said control unit comprises:
a steering-torque measuring means connected to receive the output signal of said torque sensor for measuring the operator-induced steering torque;
a vehicle-speed measuring means connected to receive the output signal of said vehicle-speed sensor for measuring the vehicle speed;
a memory means for storing predetermined voltage values corresponding to varying vehicle speeds and steering torques;
a motor-voltage determining means connected to read out from said memory means an appropriate voltage value corresponding to the measured steering torque and the measured vehicle-speed for determining voltage to be imposed on said motor; and
a motor-voltage controlling means for controlling running operation of said motor in accordance with the voltage determined by said motor-voltage determining means.

7. A motor-driven power steering system for a vehicle according to claim 6 wherein said memory means comprises:
a reduction-ratio storage means for storing predetermined reduction ratios of the steering torque corresponding to varying vehicle speeds; and
a control-torque calculating means connected to read out from the reduction-ratio storage means an appropriate reduction ratio corresponding to the measured vehicle speed and for calculating an appropriate control torque by multiplying the measured steering torque by the corresponding reduction ratio so as to determine the voltage to be imposed on said motor on the basis of the calculated control torque.

8. A motor-driven power steering system for a vehicle according to claim 1 wherein said control unit comprises:
a steering-torque measuring means connected to receive the output signal of said torque sensor for measuring the operator-induced steering torque;
a vehicle-speed measuring means connected to receive the output signal of said vehicle-speed sensor for measuring the vehicle speed;
a first memory means for storing predetermined voltage values corresponding to varying vehicle speeds and steering torques;
a motor-voltage determining means connected to read out from said first memory means an appropriate voltage value corresponding to the measured steering torque and the measured vehicle speed for determining voltage to be imposed on said motor;
a motor-voltage controlling means for controlling running operation of said motor in accordance with the voltage determined by said motor-voltage determining means;
a second memory means for storing predetermined current values corresponding to varying vehicle speeds and steering torques;
a clutch-current determining means connected to read out from said second memory means an appropriate current value corresponding to the measured steering torque and the measured vehicle speed for determining current to be supplied to said first sliding clutch; and
a clutch-current controlling means for controlling switching operation of said first sliding clutch in accordance with the current determined by said clutch-current determining means.

9. A motor-driven power steering system for a vehicle according to claim 8 wherein said memory means comprises:
a first reduction-ratio storage means for storing first predetermined reduction ratios of the steering torque corresponding to varying vehicle speeds; and
a first control-torque calculating means connected to read out from said first reduction-ratio storage means a first appropriate reduction ratio corresponding to the measured vehicle speed and for calculating a first appropriate control torque by multiplying the measured steering torque by the corresponding first reduction ratio so as to determine the voltage to be imposed on said motor on the basis of the first calculated control torque;
and wherein said second memory means comprises:
a second reduction-ratio storage means for storing second predetermined reduction ratios of the steering torque corresponding to varying vehicle speeds; and
a second control-torque calculating means connected to read out from said second reduction-ratio storage means a second appropriate reduction ratio corresponding to the measured vehicle speed and for calculating a second appropriate control torque by multiplying the measured steering torque by the corresponding second reduction ratio so as to determine the current to be supplied to said first sliding clutch on the basis of the second calculated control torque.

10. A motor-driven power steering system for a vehicle comprising:
a steering wheel;
a steering shaft fixedly connected with said steering wheel for integral rotation therewith;
a vehicle-speed sensor for detecting travelling speed of the vehicle to generate an output signal representative of the detected vehicle speed;
a torque sensor mounted on said steering shaft for detecting operator-induced steering torque resulting from steering force exerted on said steering wheel by an operator to generate an output signal representative of the detected steering torque;
a first pinion operatively connected with said steering shaft and connected to be driven by said steering wheel through an intermediary of said steering shaft;
a rack operatively connected through tie rods with a pair of steerable road wheels and having a first rack tooth portion and a second rack tooth portion formed thereon, said first rack tooth portion being in meshing engagement with said first pinion;
a second pinion being in meshing engagement with said second rack tooth portion on said rack;
a motor adapted to be energized by a battery and operatively connected through a speed-reduction gear with said second pinion for power assisting steering motion of said rack induced by the operator through an intermediary of said steering wheel, said steering shaft, said first pinion, and said first rack tooth portion;
a first electromagnetic sliding clutch interposed between said motor and said second pinion for transmitting power therebetween substantially in proportion to a current supplied thereto;
a second electromagnetic switching clutch interposed between said motor and said second pinion for selectively disconnecting the operative connection between said motor and said second pinion when the vehicle speed increases above a prescribed level and establishing the operative connection therebetween when the vehicle speed decreases below the prescribed level; and
a control unit connected to receive output signals from said torque sensor and said vehicle-speed sensor for controlling respective running and switching operations of said motor and said first sliding clutch in such a manner that the power-assisting force transmitted from said motor toward said rack through said first sliding clutch is gradually decreased before said second switching clutch is switched off and gradually increased after said second switching clutch is switched on.

11. A motor-driven power steering system for a vehicle according to claim 10 wherein the power-assisting force transmitted from said motor toward said rack through said first sliding clutch is gradually decreased and increased in inverse proportion to the measured vehicle speed.

12. A motor-driven power steering system for a vehicle according to claim 10 wherein the power-assisting force transmitted from said motor toward said rack through said first sliding clutch is gradually decreased and increased in a stepwise fashion.

13. A motor-driven power steering system according to claim 10 wherein said control unit comprises:
a steering-torque measuring means connected to receive the output signal from said torque sensor for measuring the operator-induced steering torque;

a vehicle-speed measuring means connected to receive the output signal of said vehicle-speed sensor for measuring the vehicle speed;

a memory means for storing predetermined current values corresponding to varying vehicle speeds and steering torques;

a clutch-current determining means connected to read out from said memory means an appropriate current value corresponding to the measured steering torque and the measured vehicle-speed for determining current to be supplied to said first sliding clutch; and a clutch-current controlling means for controlling switching operation of said first sliding clutch in accordance with the current determined by said clutch-current determining means.

14. A motor-driven power steering system for a vehicle accoding to claim 13 wherein said memory means comprises:

a reduction-ratio storage means for storing predetermined reduction ratios of the steering torque corresponding to varying vehicle speeds; and a control-torque calculating means connected to read out from said reduction-ratio storage means an appropriate reduction ratio corresponding to the measured vehicle speed and for calculating an appropriate control torque by multiplying the measured steering torque by the corresponding reduction ratio so as to determine the current to be supplied to said first sliding clutch on the basis of the calculated control torque.

15. A motor-driven power steering system according to claim 10 wherein said control unit comprises:

a steering-torque measuring means connected to receive the output signal from said torque sensor for measuring the operator-induced steering torque;

a vehicle-speed measuring means connected to receive the output signal of said vehicle-speed sensor for measuring the vehicle speed;

a memory means for storing predetermined voltage values corresponding to varying vehicle speeds and steering torques;

a motor-voltage determining means connected to read out from said memory means an appropriate voltage value corresponding to the measured steering torque and the measured vehicle speed for determining voltage to be supplied to said motor; and a motor-voltage controlling means for controlling running operation of said motor in accordance with the voltage determined by said motor-voltage determining means.

16. A motor-driven power steering system for a vehicle according to claim 15, wherein said memory means comprises:

a reduction-ratio storage means for storing predetermined reduction ratios of the steering torque corresponding to varying vehicle speeds; and a control-torque calculating means connected to read out from said reduction-ratio storage means an appropriate reduction ratio corresponding to the measured vehicle speed and for calculating an appropriate control torque by multiplying the measured steering torque by the corresponding reduction ratio so as to determine the voltage to be imposed on said motor on the basis of the calculated control torque.

17. A motor-driven power steering system for a vehicle according to claim 10 wherein said control unit comprises:

a steering-torque measuring means connected to receive the output signal of said torque sensor for measuring the operator-induced steering torque;

a vehicle-speed measuring means connected to receive the output signal of said vehicle-speed sensor for measuring the vehicle speed;

a first memory means for storing predetermined voltage values corresponding to varying vehicle speeds and steering torques;

a motor-voltage determining means connected to read out from said first memory means an appropriate voltage value corresponding to the measured steering torque and the measured vehicle-speed for determining voltage to be imposed on said motor;

a motor-voltage controlling means for controlling running operation of said motor in accordance with the voltage determined by said motor-voltage determining means;

a second memory means for storing predetermined current values corresponding to varying vehicle speeds and steering torques;

a clutch-current determining means connected to read out from said second memory means an appropriate current value corresponding to the measured steering torque and the measured vehicle speed for determining current to be supplied to said first sliding clutch; and a clutch-current controlling means for controlling switching operation of said first sliding clutch in accordance with the current determined by said clutch-current determining means.

18. A motor-driven power steering system for a vehicle according to claim 17 wherein said first memory means comprises:

a first reduction-ratio storage means for storing first predetermined reduction ratios of the steering torque corresponding to varying vehicle speeds; and a first control-torque calculating means connected to read out from said first reduction-ratio storage means a first appropriate reduction ratio corresponding to the measured vehicle speed and for calculating a first appropriate control torque by multiplying the measured steering torque by the corresponding reduction ratio so as to determine the voltage to be imposed on said motor on the basis of the first calculated control torque;

and wherein said second memory means comprises:

a second reduction-ratio storage means for storing second predetermined reduction ratios of the steering torque corresponding to varying vehicle speeds; and a second control-torque calculating means connected to read out from the second reduction-ratio storage means a second appropriate reduction ratio corresponding to the measured vehicle speed and for calculating a second appropriate control torque by multiplying the measured steering torque by the corresponding second reduction ratio so as to determine the current to be supplied to said first sliding clutch on the basis of the calculated control torque.

* * * * *